(12) United States Patent
Smithbaker et al.

(10) Patent No.: US 7,307,798 B2
(45) Date of Patent: Dec. 11, 2007

(54) MULTI-STEP LOCKING EYE CUP TWIST UP DEVICE

(75) Inventors: John Smithbaker, Riverton, WY (US); Brendon Weaver, Riverton, WY (US); Mosashi Kato, Warabi (JP); Hiroaki Ishigaki, Warabi (JP)

(73) Assignee: The Brunton Company, Riverton, WY (US)

( * ) Notice: Subject to any disclaimer, the term of this patent is extended or adjusted under 35 U.S.C. 154(b) by 57 days.

(21) Appl. No.: 10/629,241

(22) Filed: Jul. 29, 2003

(65) Prior Publication Data

US 2005/0024740 A1 Feb. 3, 2005

(51) Int. Cl.
*G02B 15/14* (2006.01)
*G02B 7/02* (2006.01)

(52) U.S. Cl. .................. 359/694; 359/699; 359/701; 359/823; 359/695

(58) Field of Classification Search ............ 359/830, 359/823–826, 694–703; 396/83, 72, 75, 396/76, 80, 89, 106, 448, 462, 535, 542
See application file for complete search history.

(56) References Cited

U.S. PATENT DOCUMENTS

| | | | | |
|---|---|---|---|---|
| 4,576,446 A * | 3/1986 | Kamata | ............... | 359/703 |
| 5,012,273 A * | 4/1991 | Nakamura et al. | ............ | 396/462 |
| 5,151,729 A * | 9/1992 | Takayama | ............... | 396/83 |
| 5,255,124 A * | 10/1993 | Iwamura | ............... | 359/694 |
| 5,270,868 A * | 12/1993 | Nomura | ............... | 359/700 |
| 5,285,322 A * | 2/1994 | Horning et al. | ............ | 359/826 |
| 5,293,192 A * | 3/1994 | Akitake et al. | ............... | 396/62 |
| 5,687,029 A * | 11/1997 | Omi et al. | ............... | 359/700 |
| 5,719,709 A * | 2/1998 | Kodaka | ............... | 359/694 |
| 6,195,212 B1 * | 2/2001 | Miyamoto | ............... | 359/699 |
| 6,522,481 B2 * | 2/2003 | Nomura et al. | ............... | 359/699 |
| 6,567,222 B2 * | 5/2003 | Shirota | ............... | 359/699 |
| 6,580,566 B1 * | 6/2003 | Kamoda | ............... | 359/701 |
| 6,661,589 B2 * | 12/2003 | Takanashi et al. | ............ | 359/819 |
| 6,825,991 B2 * | 11/2004 | Takanashi et al. | ............ | 359/696 |

FOREIGN PATENT DOCUMENTS

JP 3090513 U 9/2002

* cited by examiner

*Primary Examiner*—Loha Ben
(74) *Attorney, Agent, or Firm*—Foley & Lardner LLP

(57) ABSTRACT

The present invention is a Twist Up device that consists of multiple pin-movement sections and pin-stopping sections. The pin-movement sections have Twist Up adjustment grooves in multiple steps, and these adjustment grooves allow the Twist Up ring to move the Twist Up adjustment pins in the direction of the set grooves. The pin-stopping sections are positioned next to the pin-movement sections so that they can stop the Twist Up adjustment pins to prevent the Twist Up ring to move in the direction of the set grooves.

12 Claims, 11 Drawing Sheets

MULTI-STEP LOCKING EYE CUP TWIST UP DEVICE

FIELD OF THE INVENTION

This present invention is a Multi-Step Locking Eye Cup Twist Up Device and Apparatus in the field of eyepieces, and more specifically, it for application to optical and mechanical eyepieces such as those used in the fields of binoculars, monoculars, field glasses, telescopes, and focusing devices, to make it easy to adjust or maintain the focus in one or more selectable or discrete steps.

BACKGROUND OF THE INVENTION

With focusing devices, which include binoculars, monoculars, field glasses, and telescopes, there are different distances between the eyepiece lenses and eyeballs that are comfortable to the users due to the differences in their vision. Therefore, the eyepieces (the part that is in contact with eyes) of binoculars are often equipped with variable focusing devices, or "Twist Up devices", that can adjust the distance between the eyepiece lenses and eyeballs.

A commonly used Twist Up device is basically composed of a Twist Up ring and a support ring that is often called a split-image suppressor ring. The Twist Up ring has a longer Twist Up adjustment groove, and the support ring is contained inside the Twist Up ring, and it is equipped with the Twist Up adjustment pins that are inserted into the above Twist Up adjustment groove. The Twist Up device moves the Twist Up adjustment pins inside the Twist Up adjustment groove along its circumference, and it twists up by moving the Twist Up ring against the support ring in the adjustment groove. In so doing, the distance between the eyepiece lenses and eyeballs is made larger or smaller by the distance that the Twist Up ring has moved.

The Twist Up adjustment groove in the conventional Twist Up ring is set in a straight line, diagonally from the opening at one end to the opening at the other end of the Twist Up ring. For this reason, when the conventional Twist Up device was operated by moving the Twist Up ring against the support ring so that the pin slides along the groove to a desired position. However, there is no means known in the art to fix the Twist Up ring at a fixed position. Consequently, when the Twist Up ring is pressed against the eyeballs to look at something, the pin tends to slide in the groove and the Twist Up ring consequently rotates, and it was not possible to maintain the desired position originally obtained by manipulating the Twist Up device. As a result, a focusing device with the conventional Twist Up devices known in the art fail to secure a proper distance between the eyepiece lenses and eyeballs which causes images to lose focus, difficulty in seeing desired objects and other inconveniences to the user.

In an attempt to resolve this limitation in the art, a Twist Up device has been developed with a retaining section using a spring-operated retaining ball in the support ring, which can be pushed against the Twist Up ring and held steady in the Twist Up adjustment groove of the Twist Up ring. With this Twist Up device, when the Twist Up ring is moved along the support ring in a set groove and the retaining ball comes to the set position in the retaining section and remains in the retaining section by the spring action. As a result, the retaining ball restricts the Twist Up ring from moving to the direction of the groove. Thus, this Twist Up device is able to prevent the movement of the Twist Up ring when the user was looking at something through the focusing device, such as a binocular or other device as mentioned above.

However, there are limitations to the art of Twist Up devices having a restraining ball and spring. The above retaining ball is held in place only the spring force. So, when a force applied to the focusing device is stronger than the spring force applied to the Twist Up device, the retaining ball comes off of the retaining section, and the Twist Up ring moves thereby failing to maintain the desired position obtained by manipulating the Twist Up device, which is a significant shortcoming.

Another limitation to Twist Up devices having a retaining ball and spring is the increased number of parts required for manufacturing the devices in addition to using the device. Additionally, a special manufacturing process is necessary to secure the above-mentioned retaining function. The increased number of parts complicates the manufacturing process, increases the manufacturing costs, and increase the number of components which may potentially fail. These are further shortcomings in the art.

OBJECT AND ADVANTAGES OF THE INVENTION

The objectives of the present invention are to solve or avoid the above shortcomings held by the conventional Twist Up devices. In other words, the objectives of the present invention are to make it possible to securely maintain the adjustment position obtained by manipulating the Twist Up device even when a force is applied while focusing device is in use, to limit the number of parts to as few as possible, to enhance the ability of the focus device to remain in focus with increased force applied to the focusing device, and to provide a Twist Up device with its manufacturing cost kept low.

SUMMARY OF THE INVENTION

The present invention teaches a Twist Up device having a support ring equipped with one or more Twist Up adjustment pins that protrude toward the outer circumference, and one or more Twist Up adjustment grooves that hold the above Twist Up adjustment pins in such a way as to allow them to move in a set groove. A Twist Up ring is installed in the Twist Up device in such a way as to allow it to move in a set groove around the outer circumference of the said support ring, while letting these Twist Up adjustment pins move in a set groove inside the said Twist Up adjustment grooves. The Twist Up device features these Twist Up adjustment grooves installed in multiple steps.

The present invention also teaches a Twist Up device having a support ring with one or more Twist Up adjustment pins that protrude toward the outer circumference, and of one or more Twist Up adjustment grooves that hold the above Twist Up adjustment pins in such a way to allow them to move in a set groove. At least one Twist Up ring is installed in the Twist Up device in such a way as to allow the Twist Up ring to move in a set groove around the outer circumference of the said support ring, while letting the Twist Up adjustment pin move in a set groove inside the said Twist Up adjustment grooves.

The Twist Up device features the following components: (1) at least one pin movement section that allows at least one Twist Up adjustment groove to make the Twist Up adjustment pin move in a desired set-groove direction; (2) at least one pin-stopping section that is installed next to the said pin-movement section to engage the at least one above-mentioned Twist Up adjustment pins to prevent the said Twist Up ring from moving in a direction of the set movement groove. Furthermore, in one embodiment of the present invention, to give a proper style to the Twist Up device, the pin-movement section is installed so that it extends diagonally from the first opening to the second opening of the Twist Up ring, and the above pin-stopping section is installed in the direction from the end of the second opening of the above pin-movement section to the circumference perpendicular to the axis line of the above Twist Up ring, or to the direction of the first opening mentioned above.

In the preferred embodiment of the present invention, the Twist Up adjustment grooves contain the following sections:
1. A first pin-movement section.
2. A first pin-stopping section that is installed in the direction from the end of the second opening of the above pin-movement section to the above-mentioned first opening.
3. A second pin-movement section that is installed in the direction from the end of the first opening of the first pin-stopping section to the second opening.
4. A second pin-stopping section that is installed in the direction from the end of the second opening of the second pin-movement section to the first opening.
5. A third pin-movement section that is installed in the direction from the end of the first opening of the pin-stopping section to the direction of the second opening.
6. A third pin-stopping section installed in the direction from the end of the second opening of the third pin-movement section to the circumference that is perpendicular to the axis line of the above Twist Up ring.

The Twist Up ring has an angled contact section that contacts the Twist Up adjustment pin at the end of the pin-movement section from the opening side in extension from the end to the pin-movement section.

The support ring fits inside the inner circumference of the Twist Up ring and it has a resisting part that gives a required resistance force against the movement of the Twist Up ring when the Twist Up device is operated.

BRIEF DESCRIPTION OF THE DRAWINGS

The nature, objects and advantages of the invention will be more fully understood from the following description of the preferred embodiments shown by way of example in the accompanying drawings in which.

DESCRIPTION OF THE PREFERRED EMBODIMENTS

Figure 1:
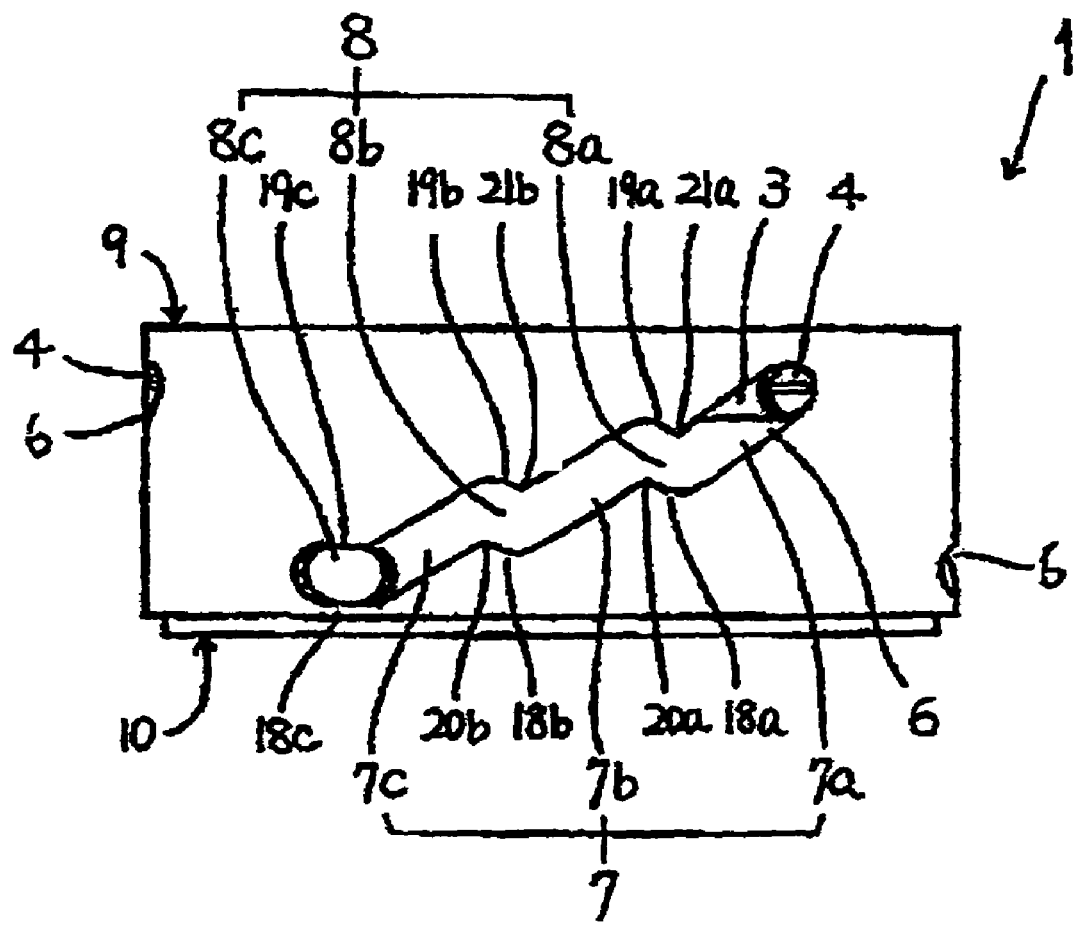
FIG. 1 is a front view of a preferred embodiment of the Twist Up device 1, in accordance with the present invention.

FIG. 1 shows a front view of the Twist Up device 1, which is one example of the Twist Up device to embody this concept. The Twist Up device 1 consists of the Twist Up ring 2, the support ring 3, the Twist Up adjustment pins 4 and the resistance part 5. The Twist Up device 1 is formed by these parts combined in one unit.

Figure 2:
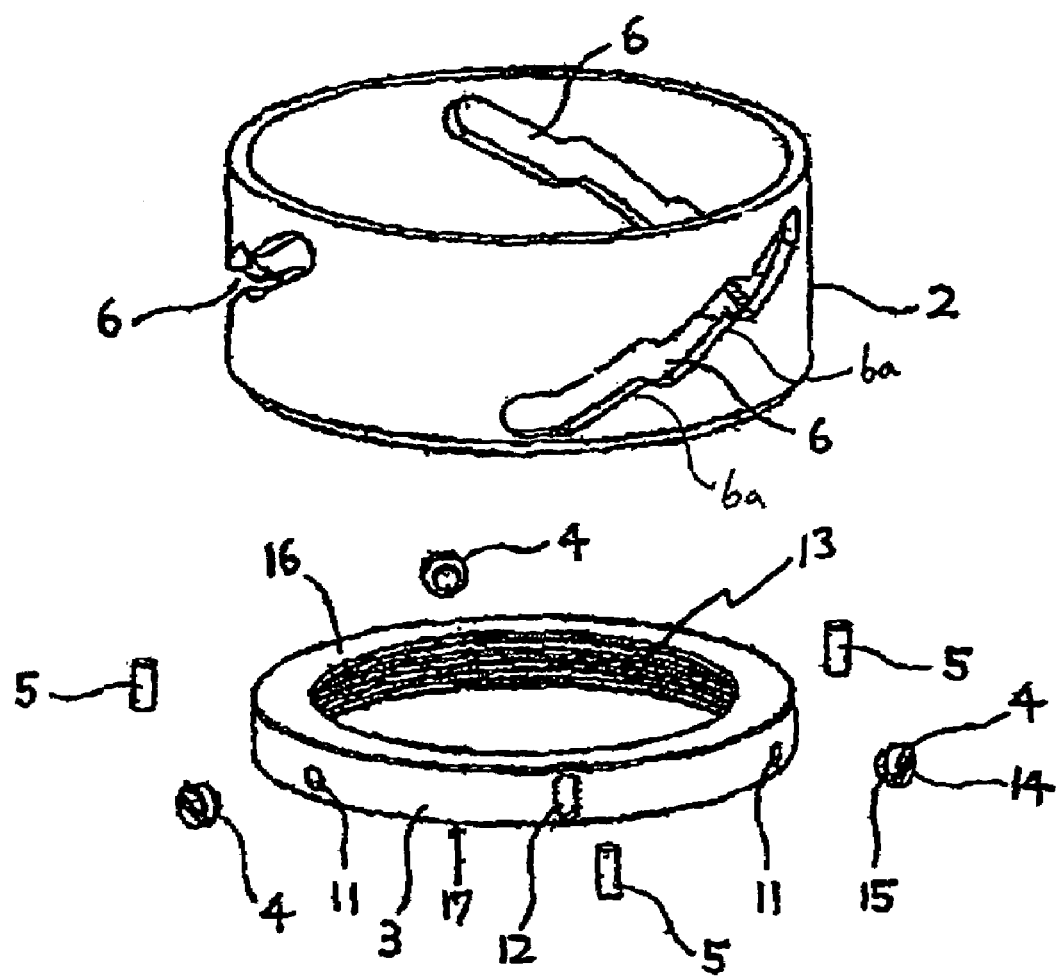
FIG. 2 is an exploded side view of a the Twist Up device in FIG. 1.

FIG. 2 is a side overview of the Twist Up ring 2, the support ring 3, the Twist Up adjustment pins 4 and the resistance part 5 respectively before they are combined. It will be appreciated that the present invention may be practiced with as few as one adjustment pin 4, or may include as many adjustment pins 4 as might be desired, even exceeding the number of adjustment pins 4 shown in the preferred embodiment in FIG. 2.

The Twist Up ring 2 is a part that moves in a groove against the support ring 3 when the Twist Up device 1 is operated. The Twist Up ring 2 has a first opening 9 and a second opening 10, which are located at each respective end of the ring 2, and three Twist Up adjustment grooves 6 that are made around its circumference in equal distance. It will be appreciated that the present invention may be practiced with as few as one adjustment groove 6 or may include as many adjustment grooves 6 as might be desired, even exceeding the three adjustment grooves 6 shown in the preferred embodiment in FIG. 2.

The Twist Up adjustment groove 6 holds the Twist Up adjustment pin 4, and by regulating the motion of the Twist Up adjustment pin 4 when the Twist Up device is operated, the groove 6 has a function to determine the motion of the Twist Up ring 2 toward the support ring 3.

The Twist Up adjustment grooves 6 are shaped with multiple steps 6a, as shown in FIGS. 1 and 2. The Twist Up adjustment grooves 6 consist of the pin movement sections 7 and the pin stopping sections 8, both of which are placed alternately in the Twist Up adjustment grooves 6.

The pin movement sections 7 enable the Twist Up adjustment pins 4, which are inserted into the Twist Up adjustment grooves 6, to move in the groove 6 direction or to the opening 9 or 10 of the Twist Up ring 2. Three pin movement sections 7 are set up to hold the pin stopping sections between them. In other words, the pin movement sections 7 consist of the pin movement sections 7a, 7b and 7c from the opening 9. Each pin movement section 7 is set in a straight line diagonally with the same incline from the opening 9 to the opening 10 of the Twist Up ring 2. Here, "a straight line" means that it is a straight line in the direction of the axis line of the Twist Up ring 2.

The pin stopping sections 8 are set up to stop and prevent the Twist Up pins 4 from moving in a groove 6 toward the opening 9 or 10 of the Twist Up ring 2.

The pin stopping sections 8 are set at the ends of the opening 10 of each pin movement section 7 at three places. It will be appreciated that the present invention may be practiced with one or more the pin stopping sections 8. In other words, as shown in the preferred embodiment, the pin stopping sections 8 are composed of the following three parts:

As to the first part, The pin stopping section 8a, set so as to connect the side end of the opening 10 of the pin movement section 7a and the side end of the opening 9 of the pin movement section 7b.

As to the second part, the pin stopping section 8b, set so as to connect the side end of the opening 10 of the pin movement section 7b and the side end of the opening 9 of the pin movement section 7c, and As to the third part, the pin stopping section 8c, set at the side end of the opening 10 of the pin movement section 7c.

The pin stopping section 8a is set with a slight incline from the side end of the opening 10 of the pin movement section 7a toward the opening 9. The pin stopping section 8b is also set with a slight incline from the side end of the opening 10 of the pin movement section 7b toward the opening 9. The pin stopping section 8c is set parallel from the side end of the opening 10 of the pin movement section 7c to the openings 9 and 10, or toward the circumference of the circle perpendicular to the axis line of the Twist Up ring 2.

As shown in FIG. 1 with respect to the depiction of the Twist Up adjustment groove 6, the Twist Up ring 2 contains the following parts:

A lower stopping section 18a and the upper stopping section 19a, which form the pin stopping section 8a, A lower stopping section 18b and the upper stopping section 19b, which form the pin stopping section 8b, and A lower stopping section 18c and the upper stopping section 19c, which form the pin stopping section 8c.

The Twist Up ring 2 has the following four angled contact sections 20a, 20b, 21a and 21b:

An upper angled contact section 21a, which can contact the Twist Up adjustment pin 4, located at the side end of the opening 10 of the pin movement section, from the opening 9 in the direction that the pin movement section extends from its end, An upper angled contact section 21b, which can contact the Twist Up adjustment pin 4, located at the side end of the opening 10 of the pin movement section 7b, from the side of the opening 9, A lower angled contact section 20a, which can contact the Twist Up adjustment pin 4, located at the side end of the opening 9 of the pin movement section 7b, from the side of the opening 10, and A lower angled contact section 20b, which can contact the Twist Up adjustment pin 4, located at the side end of the opening 9 of the pin movement section 7c, from the side of the opening 10.

The width of the pin movement section 7 and of the pin stopping section 8, or the width of the Twist Up adjustment groove 6, is determined by the size of the Twist Up adjustment pin 4 that can move in the groove of the Twist Up adjustment groove 6. In particular, the distance between the lower angled contact section 20a and the upper angled contact section 21a, and the distance between lower angled contact section 20b and the upper angled contact section 21b are set at the size that allows the Twist Up adjustment pins 4 to pass between them only after a certain strong force is applied to the Twist Up ring 2.

The length of the pin movement section 7 is determined by the extent that allows effective adjustments in the Twist Up 1 operation. The length of the pin stopping section 8 is determined by the extent that allows the Twist Up adjustment pins 4 to stop, prevents them to move in the direction of the groove and yet creates no trouble in the Twist Up operation.

As for the material of the Twist Up ring 2, there is no special restriction as long as it can perform the above functions. For example, metal and plastics are be recommended. Materials may be selected which demonstrate characteristics for strength and low wear with repeated use.

The support ring 3 is fixed to the eyepiece, such as a binocular, monocular, field glasses, telescope, or other focusing device, and supports the Twist Up ring 2. On the outer circumference of the support ring 3, this part moves the Twist Up ring 2 in the groove. The support ring 3 is contained inside the Twist Up ring 2 of the Twist Up device 1.

The support ring 3 has three pin insert grooves 11 and three holes covered with resistance material 12. The pin insert grooves 11 fix the Twist Up adjustment pins 4 inside by mating with the Twist Up adjustment pins 4. The three pin insertion grooves 11 are positioned so that the Twist Up adjustment pins 4, which are inserted into the pin insertion grooves 11, can be inserted into the different Twist Up adjustment grooves 6 respectively. The holes covered with resistance material 12 fix the resistance material 5 by mating with it. The holes covered with resistance material 12 are positioned so that, when the Twist Up adjustment pins 4 fixed in the pin insertion grooves 11 are inserted into the different Twist Up adjustment grooves 6 respectively, they do not stick out of the Twist Up adjustment grooves 6.

The support ring 3 contains a spiral groove 13 in its inner circumference, which is used to fix the Twist Up device 1 by spiral-fitting it into the eyepieces of a binocular.

As shown in FIG. 2, the support ring 3 has the openings 16 and 17, and in the condition of being attached to the Twist Up ring 2 as mentioned above, and when there is the Twist Up adjustment pins 4 at the side end of the opening 9 of the Twist Up adjustment groove 6, the surface of the opening 16 of the support ring 3 and the surface of the opening 9 of the Twist Up ring 2 form the same surface.

As for the material of the support ring 3, there is no special restriction as long as it can perform the above functions. For example, metal and plastics are be recommended. Materials may be selected which demonstrate characteristics for strength and low wear with repeated use.

In the preferred embodiment the adjustment pins 4 are shown as screws inserted into the pin insertion grooves 11 of the support ring 3. Those skilled in the art will appreciate that present invention may also be practiced with adjustment pins 4 which are pegs which insert into grooves 11, phalanges which are adhered to the support ring 3, or phalanges or denticles which are formed as part of the support ring 3.

The Twist Up adjustment pin 4 is inserted into the Twist Up adjustment groove 6 when the Twist Up device is operated. By moving inside the Twist Up adjustment groove 6, these parts regulate the motion of the Twist Up ring 2 against the support ring 3.

A shown in FIG. 2, the Twist Up adjustment pins 4 consist of at least one head 14 and one leg 15, and the heads 14 are contained inside the Twist Up adjustment groove 6, and as the legs 15 are screwed into the pin insert grooves 11, they are fixed to the support ring 3. While the heads 14 are thus fixed into the support ring 3, their size is such that they can move inside the Twist Up adjustment groove 6 without sticking out of the surface of the outer circumference of the Twist Up ring 2.

Those skilled in the art will appreciate that the heads 14 may have any suitable shape which will fit into and move in the Twist Up adjustment groove 6, including circular, oval, square, rectangular, triangular, hexagonal, octagonal, n-gonal, or irregular shaped, having either smooth or defined edges and contours. Furthermore, the legs 15 may screw into the pin insert grooves 11 as shown, but may also snap into the pin insert groove 11 using a nob and fitting configuration, lock into the pin insert groove 11 using a lock and key configuration, be adhered into the pin insert groove using an appropriate epoxy or adhesive, or be wedged into the pin insert groove 11, as might be desired.

As for the material of the Twist Up adjustment pins 4, there is no special restriction as long as it can perform the above functions. For example, metal and plastics are be recommended. Materials may be selected which demonstrate characteristics for strength and low wear with repeated use.

The resistance part 5 gives a required resistance to the movement of the Twist Up ring 2 in the groove against the support ring 3 when the Twist Up device is operated. The resistance part 5 is mated to the grooves covered with the resistance material of the support ring 3, and its outer circumference slightly sticks out of that of the support ring 3. Therefore, when the support ring 8 is inserted into the Twist Up ring 2 with the resistance material 5 attached to the support ring 3, the outer circumference of the resistance material sticking out from the surface of the outer circumference of the support ring 3 will contact the inner surface of the Twist Up ring 2. As a result, when the Twist Up device is operated, a required resistance force is given to the groove motion of the Twist Up ring 2.

The size of the resistance material 5 is determined by the size of the resistance force given by the groove motion of the Twist Up ring 2. In other words, to increase the above resistance force, the portion that sticks out from the surface of the outer circumference of the support ring 3 is increased, and the resistance material 5 is made larger in order to strengthen its contact with the inner surface of the Twist Up ring 2. To reduce the above resistance force, the portion that sticks out from the surface of the outer circumference of the support ring 3 is decreased, and the resistance material 5 is made smaller in order to weaken its contact with the inner surface of the Twist Up ring 2.

As for the material of the resistance material 5, there is no special restriction as long as it can perform the above functions. Any type of flexible material can be suitably used. For example, some metals and many kinds of plastics are recommended. Materials may be selected which demonstrate characteristics for strength and low wear with repeated use.

The Twist Up device 1 works as follows with the above structure, as exemplified in FIGS. 3 through 7. FIGS. 3 through 7 show the front view of the Twist Up device 1, and the positional relationship of the Twist Up adjustment groove 6 and the Twist Up adjustment pins 4. However, FIGS. 3 through 7 describe only one Twist Up adjustment groove 6, and it will be appreciated by those skilled in the art that invention may be practiced with only one or as many sets of Twist Up grooves 6, Twist Up pins 4, and related components as desired.

Turning to FIGS. 3 through 7, the following positions are depicted:

Position A: The side end of the opening 9 of the pin movement section 7a of the Twist Up adjustment groove 6.

Position B1: The side end of the opening 10 (the right end of the pin stopping section 8a) of the Twist Up adjustment groove 7a.

Position B2: The side end of the opening 9 (the left end of the pin stopping section 8a) of the Twist Up adjustment groove 7b.

Position C1: The side end of the opening 10 (the right end of the pin stopping section 8a) of the Twist Up adjustment groove 7b, similar to that as shown for Position B1.

Position C2: The side end of the opening 9 (the left end of the pin stopping section 8c) of the Twist Up adjustment groove 7c, similar to that as shown for Position B2.

Position D1: The side end of the opening 10 (the right end of the pin stopping section 8c) of the Twist Up adjustment groove 7c.

Position D2: The left end of the pin stopping section 8c.

Below is an explanation of an example based on a case in which the Twist Up device 1 is fixed to the eyepiece of a binocular, with the spiral-fitting section 13 of the support ring 3 in the Twist Up device 1 screwed to the eyepiece of the binocular. Therefore, it is assumed that the eyepiece lens is fixed to the side of the opening 17 of the support ring 3.

Figure 3:
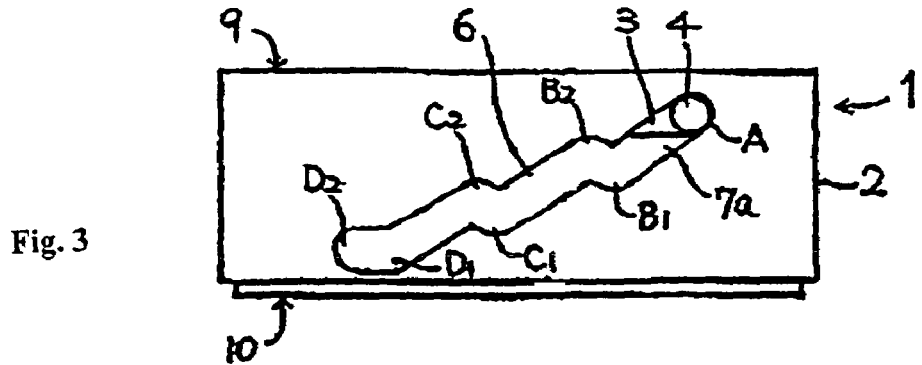
FIG. 3 is a front view of the Twist Up device in FIG. 1, showing a detail of its use when the Twist Up adjustment pin 4 is at Position A of the Twist Up adjustment groove.

As indicated in FIG. 3, the embodiment of the invention is shown with Twist Up adjustment pin 4 located at Position A of the Twist Up adjustment groove 6. In this situation, the support ring 3 takes the highest position with respect to the Twist Up ring 2, which takes the lowest position relative to the support ring 3. In other words, the distance between the opening 9 of the Twist Up ring 2 and the eyepiece lens is the shortest in this situation.

As shown in FIG. 3, when an upward force is applied to the Twist Up ring 2 along the pin movement section 7a, the Twist Up ring 2 moves upward in the groove against the support ring 3. The Twist Up adjustment pin 4 moves in the Twist Up adjustment groove 6 from Position A to Position B1. Before reaching from Position A to Position B, there is no means to stop the movement of the Twist Up adjustment pin 4. So, until the Twist Up adjustment pin 4 has moved from Position A to Position B1, or to the extent that Twist Up adjustment pins 4 can move inside the pin movement section 7a, the Twist Up ring 2 can smoothly move upward against the support ring 3 or to the direction of the groove. Therefore, in this segment the distance between the opening 9 of the Twist Up ring 2 and the eyepiece lens is variable, and by the movement of the Twist Up adjustment pins 4 from Position A to Position B1, the distance gets larger between the opening 9 of the Twist Up ring 2 and the eyepiece lens.

Figure 4:
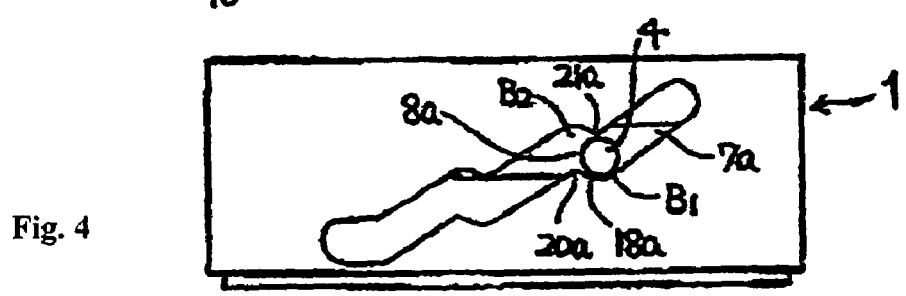
FIG. 4 is a front view of the Twist Up device in FIG. 1, showing a detail of its use when the Twist Up adjustment pin 4 is at Position B1 of the Twist Up adjustment groove.

As shown in FIG. 4, when the Twist Up adjustment pins 4 arrive at Position B1, they come into contact with the lower contact section 18a. So the movement of the Twist Up adjustment pins is stopped and as a result the upward movement of the Twist Up ring 2 against the support ring 3 is also stopped. When the Twist Up adjustment pin 4 is at Position B1, the Twist Up adjustment pins 4 come into contact with the upper angled contact section 21a as well. So, even when a downward force is applied to the Twist Up ring 2 in the direction of the axis line, the movement of the Twist Up ring 2 is stopped. Therefore, when the Twist Up adjustment pin 4 is at Position B1, the Twist Up ring 2 does not move unless a force is applied in the direction of the pin movement section 7a or of the pin stopping section 8a. The distance between the lower angled contact section 20a and the upper angled contact section 21a is set in such a way that the Twist Up adjustment pins cannot pass unless a fairly strong force is applied to the Twist Up ring 2. So the Twist Up adjustment pins 4 will not move to Position B2 unless a strong force is intentionally applied to the Twist Up ring 2 in the direction to the pin stopping section 8a. Thus, when the Twist Up adjustment pin 4 is at Position B1, the position of the opening 9 of the Twist Up ring 2 with respect to the support ring 3 is maintained constant. So it is possible to maintain the distance constant between the opening 9 of the Twist Up ring 2 and the eyepiece lens.

Figure 5:
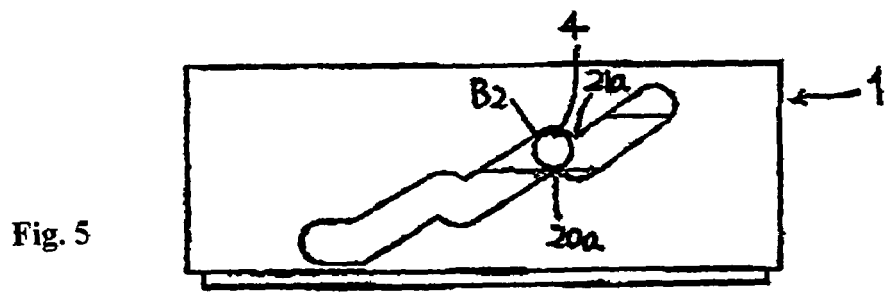
FIG. 5 is a front view of the Twist Up device in FIG. 1, showing a detail of its use when the Twist Up adjustment pin 4 is at Position B2 of the Twist Up adjustment groove.

When the Twist Up adjustment pin 4 is at Position B1 and a force is applied to the Twist Up ring 2 in the direction along the pin stopping section 8a, the Twist Up adjustment pins 4 move from Position B1 to Position B2, as shown in FIG. 5. As described above, the distance between the lower angled contact section 20a and the upper angled contact section 21a is set so as to enable the Twist Up adjustment pins 4 to pass only after a considerably strong force has been applied to the Twist Up ring 2, so that the Twist Up device 1 can produce a click sound when the Twist Up adjustment pins 4 move from Position B1 to B2.

The workings of the Twist Up adjustment pins 4 when they are moving from Position B2 to Position D1 are the same as when they are moving from Position A to Position B2. In other words, when they move from Position B2 to C1, and from C2 to D1, the distance between the opening 9 of the Twist Up ring 2 and the eyepiece lens becomes longer. Furthermore, as indicated at Position C1 and D1, the distance between the opening 9 of the Twist Up ring 2 and the eyepiece lens can be maintained constant.

Figure 6:
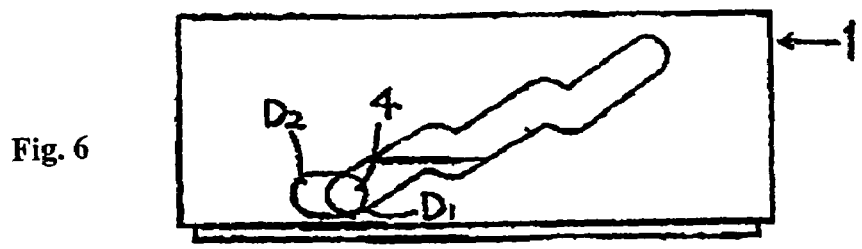
FIG. 6 is a front view of the Twist Up device in FIG. 1, showing a detail of its use when the Twist Up adjustment pin 4 is at Position D1 of the Twist Up adjustment groove.
Figure 7:
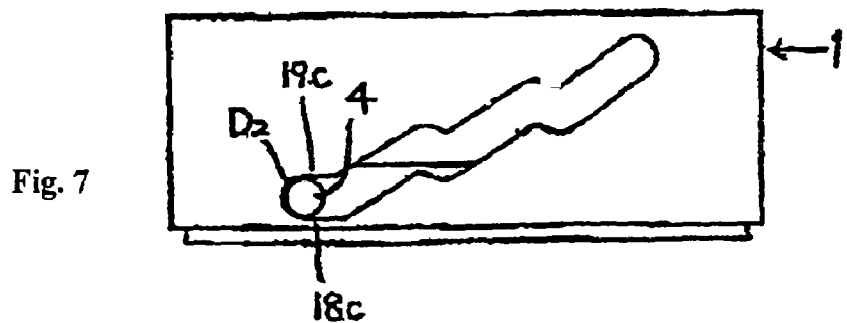
FIG. 7 is a front view of the Twist Up device in FIG. 1, showing a detail of its use when the Twist Up adjustment pin 4 is at Position D1 of the Twist Up adjustment groove.

As shown in FIG. 6, when the Twist Up adjustment pins are at Position D1, they can be easily moved to Position D2, as shown in FIG. 7, by applying a force counter-clockwise to the Twist Up ring 2 and rotating it. When the Twist Up adjustment pin 4 is at Position D1 or D2, the distance between the opening 9 of the Twist Up ring 2 and the eyepiece lens is the greatest.

When the Twist Up adjustment pin 4 is at Position D2, they are in contact with the lower contact section 18c and the upper contact section 19c. So the Twist Up ring 2 does not move upward or downward along the axis line. Therefore, when the Twist Up adjustment pin 4 is at Position D1, the distance between the opening 9 of the Twist Up ring 2 and the eyepiece lens can be maintained constant.

When the Twist Up device is operated with the Twist Up adjustment pins 4 at Position D2, a force is applied clockwise to the Twist Up ring 2 to turn it and move the Twist Up adjustment pins 4 to Position D1, and then a force is applied to the Twist Up ring 2 to turn it so that the Twist Up adjustment pins 4 move along the pin movement section 7c and to Position C2. Thus, the distance between the opening 9 of the Twist Up ring 2 and the eyepiece lens is made shorter. In Position C2, the Twist Up adjustment pins 4 contact the upper contact section 19b above the axis line, and the lower angled contact section 20b below the axis line, and so the Twist Up ring 2 does not move even if a force is applied to it in the direction of the axis line. Therefore, when the Twist Up adjustment pin 4 is at Position C2, the distance between the opening 9 of the Twist Up ring 2 and the eyepiece lens can be maintained constant.

As can be seen, the Twist Up adjustment pins 4 move in sequence, and until they reach Position A, they work the same way as previously described.

As explained above, in the Twist Up device 1, the Twist Up ring 2 can take 4 positions against the support ring 3; in other words, these four positions correspond to positions of ring 2 when the Twist Up adjustment pin 4 is in Positions A, B1 or B2, C1 or C2, and D1 or D2. And in these four positions, the Twist Up ring 2 does not move even if a force is applied in the direction of the axis line.

Since the Twist Up device 1 is equipped with the resistance material 5, the Twist Up ring 2 moves with a proper amount of resistance feel when the Twist Up device is operated. In other words, the Twist Up device 1 can make the operation of the Twist Up tube not too light or not too heavy, so that the Twist Up operation is easy and provides a good feel.

Figure 8:
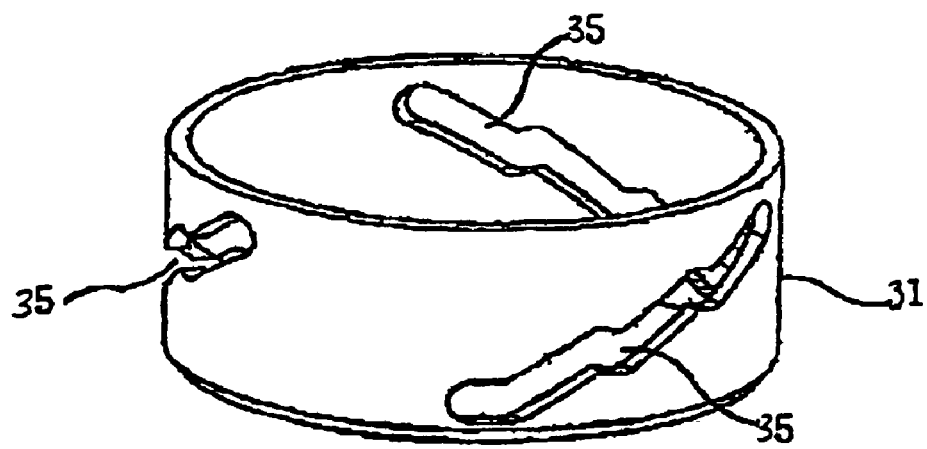
FIG. 8 is a perspective view of an alternative embodiment of the Twist Up device of FIG. 1.
Figure 9:
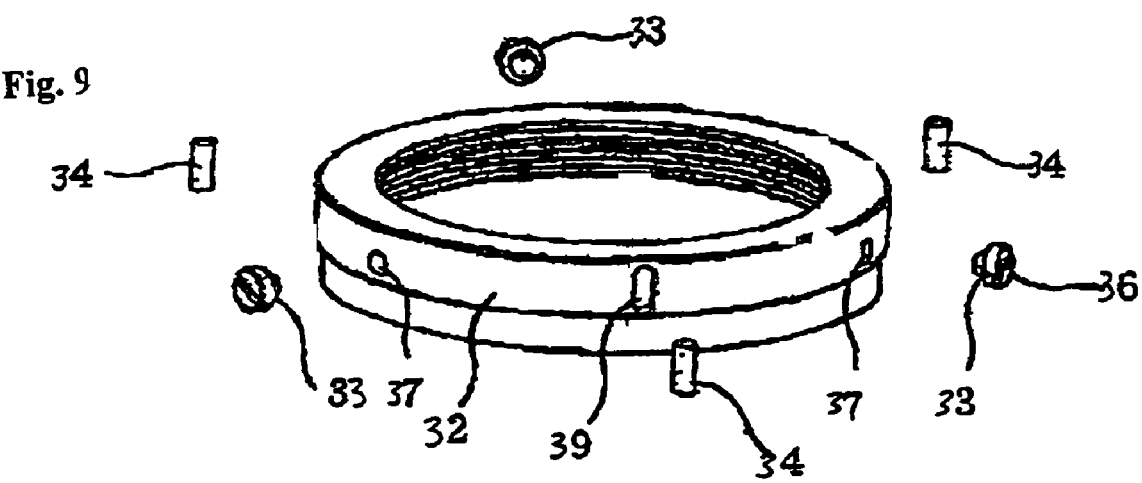
FIG. 9 is a perspective view of an alternative embodiment of the Twist Up device of FIGS. 1 and 8.
Figure 10:
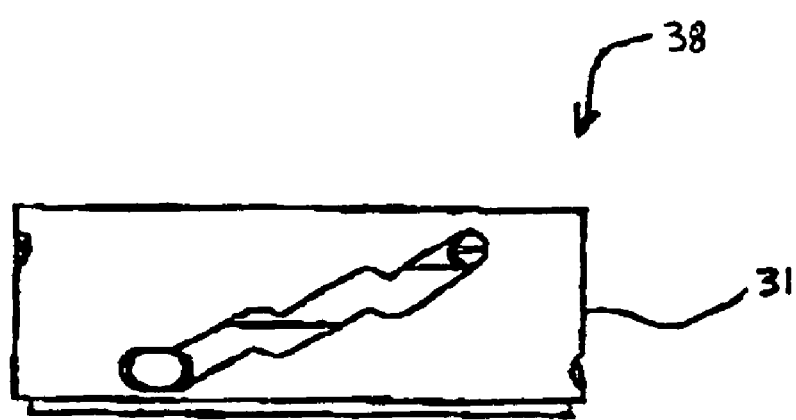
FIG. 10 is a front view of the alternative embodiment of the Twist Up device of FIGS. 8 and 9.
Figure 11:
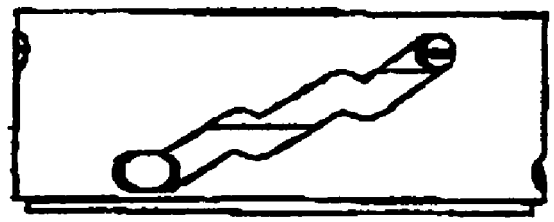
FIG. 11 is a front view of the alternative embodiment of the Twist Up device of FIGS. 8 and 9, showing the section line A-A went the pin is at the top.
Figure 12:
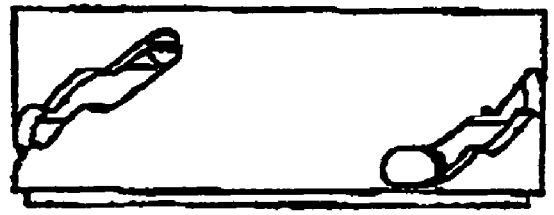
FIG. 12 is a rear view of the alternative embodiment of the Twist Up device of FIGS. 8 and 9.
Figure 13:
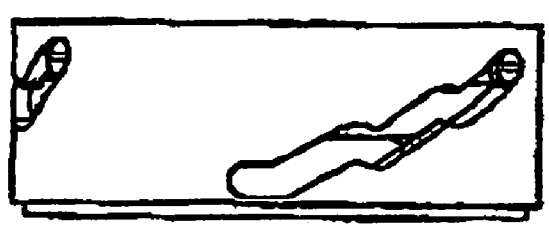
FIG. 13 is a right side view of the alternative embodiment of the Twist Up device of FIGS. 8 and 9.
Figure 14:
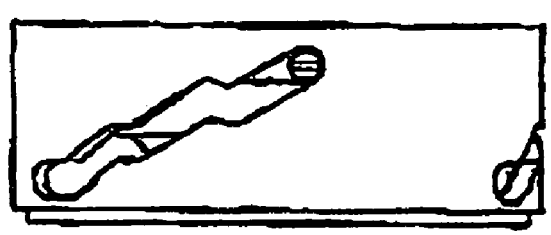
FIG. 14 is a left side view of the alternative embodiment of the Twist Up device of FIGS. 8 and 9.
Figure 15:
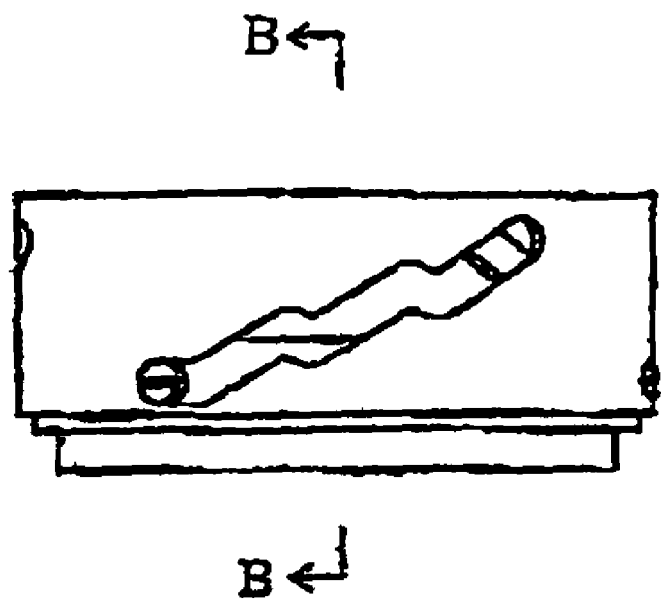
FIG. 15 is a front view of the alternative embodiment of the Twist Up device of FIGS. 8 and 9, showing the section line B-B went the pin is at the bottom.
Figure 16:
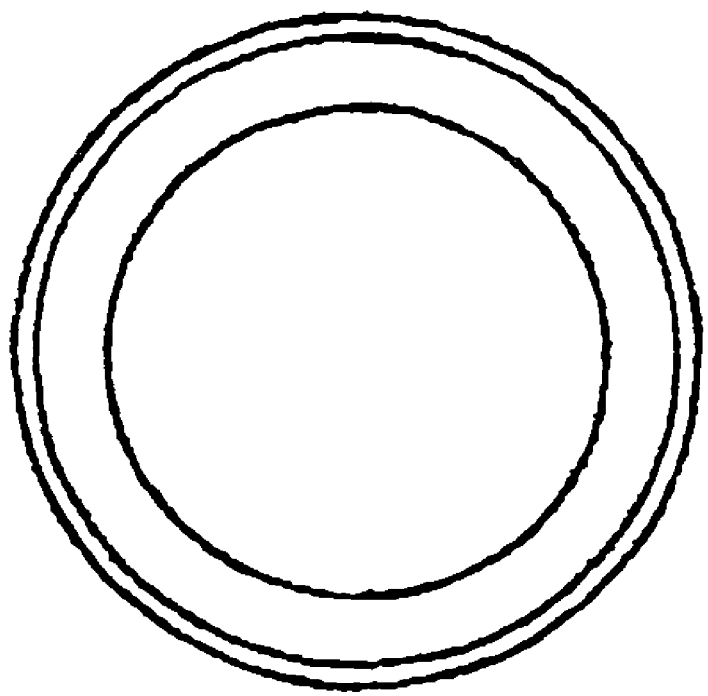
FIG. 16 is a bottom view of the alternative embodiment of the Twist Up device of FIGS. 8 and 9.
Figure 17:
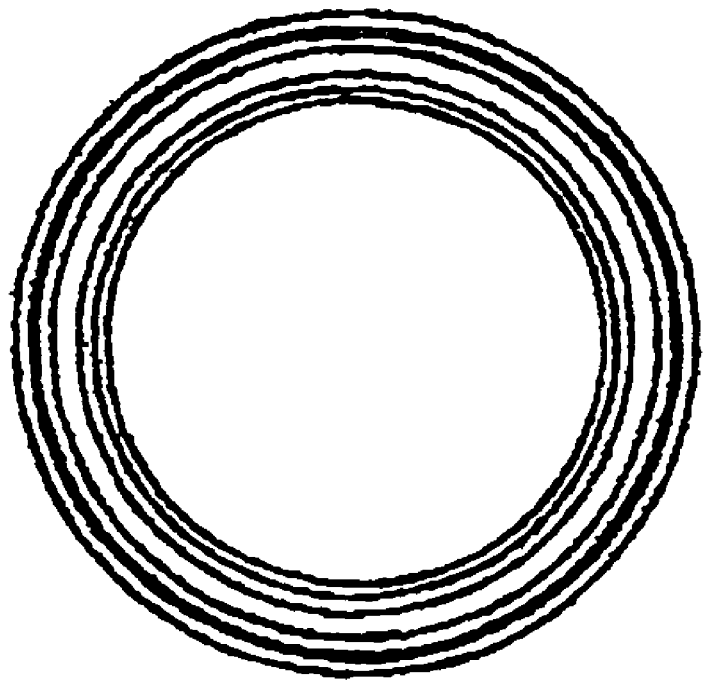
FIG. 17 is a top view of the alternative embodiment of the Twist Up device of FIGS. 8 and 9.
Figure 18:
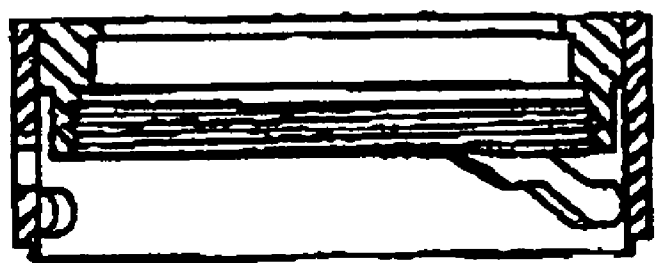
FIG. 18 is a sectional view of the alternative embodiment of the Twist Up device of FIG. 11, of the section A-A.
Figure 19:
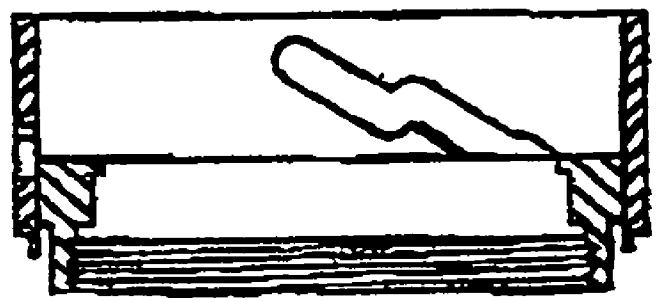
FIG. 19 is a sectional view of the alternative embodiment of the Twist Up device of FIG. 15, of the section B-B.
Figure 20:
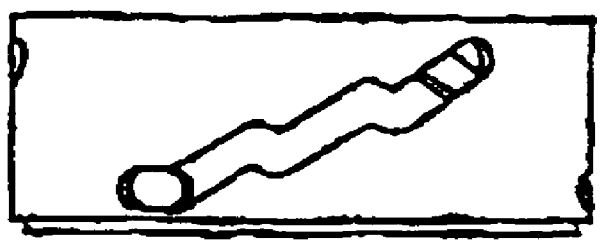
FIG. 20 is a front view of the preferred embodiment of the Twist Up device of FIG. 1.
Figure 21:
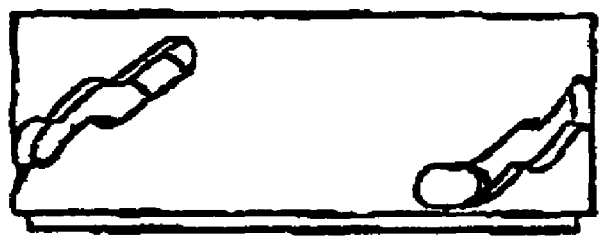
FIG. 21 is a rear view of the preferred embodiment of the Twist Up device of FIG. 1.
Figure 22:
FIG. 22 is a right side view of the preferred embodiment of the Twist Up device of FIG. 1.
Figure 23:
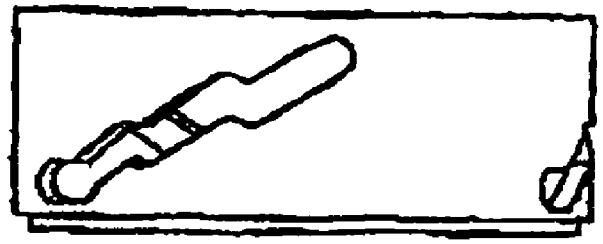
FIG. 23 is a left side view of the preferred embodiment of the Twist Up device of FIG. 1.
Figure 24:
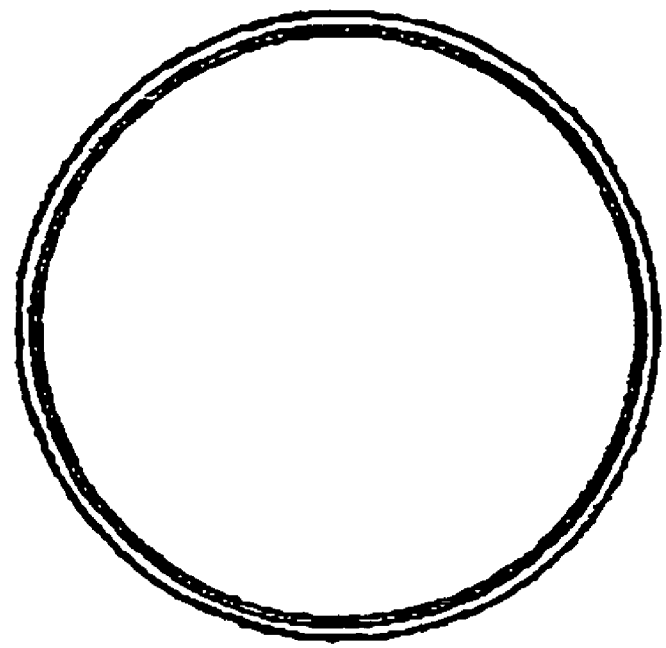
FIG. 24 is a bottom view of the preferred embodiment of the Twist Up device of FIG. 1.
Figure 25:
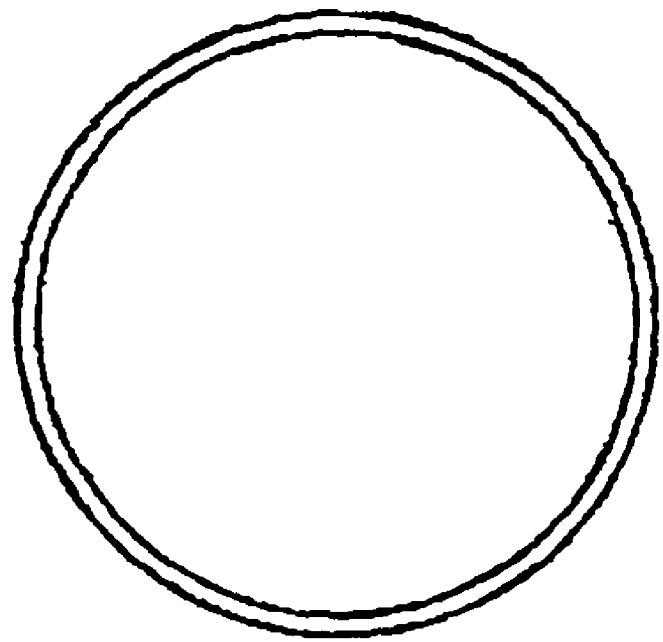
FIG. 25 is a top view of the preferred embodiment of the Twist Up device of FIG. 1.

A further and alternative embodiment of the Twist Up device, is shown in the Reference FIGS. 8, 9 and 10. As indicated in FIG. 8 the Twist Up ring 31 is used in combination of Split-image suppressor ring 32, having three Eyepiece-turning screws 33 and Torque Rubber 34. The Torque Rubber 34 may be comprised of rubber, Mylar, nylon, flexible plastic, or some other suitably durable resilient material.

The Twist Up ring 31 has three slide grooves 35, which are set diagonally in steps from an opening at one end to another opening at the other end. The torque rubber 34 is contained in the hole 39 in the split-image suppressor ring 32. A part of the torque rubber 34 sticks out from the outer surface of the split-image suppressor ring 32. The split-image suppressor ring 32 is inserted to the inside of the Twist Up ring 31. At this time, as the torque rubber 34 is pressed against and adheres to the inner surface of the Twist Up ring 31, the split-image suppressor ring 32 is installed in the Twist Up ring 31. The three pieces of eyepiece-turning screws 33 are screwed into the screw holes 37 set in the split-image suppressor ring 32 so that each of the screwheads is contained inside the respective slide grooves 35.

In FIG. 10 a front view of the Twist Up ring 31 of Twist Up device, generally indicated at 38, is attached to the eyepiece of binoculars, monoculars, field glasses, telescopes, or focusing devices, with one end of the opening facing the eyepiece lens and the other end facing the eyeball.

Turning to the Twist Up device 38, when a force is applied to the Twist Up ring 31 on the side of the eyepiece lens or of the eyeball, the Twist Up ring 31 slides toward the eyepiece lens or the eyeball along the outer surface of the split-image suppressor ring 32, shown in FIG. 9, while the torque rubber 34 is pressed against the inner surface of the Twist Up ring 31 and the screw-head 36 moves inside the slide groove 35. In the Twist Up device 38, when the Twist Up ring 31 is moved toward the eyepiece lens, the distance between the eyepiece lens and the eyeball is shortened, when the Twist Up ring 31 is moved toward the eyeball, and the distance between the eyepiece lens and the eyeball is increased.

The Twist Up ring 31, is also called "Turn Slide"

As described above, when Twist Up device 38 when force is applied to the Twist Up device 38, the moves against the Twist Up ring 31 based on its functions, which changes the relative position of the split-image suppressor ring 32 with respect to the Twist Up ring 31. The advantage of this alternative embodiment of the invention is that the screw-head 36 in the screw hole 37 moves along the slide groove 35 in the Twist Up ring 31 any position along the slide groove 35 may be fixedly selected, as desired.

When the Twist Up device 1 or 38 as shown in FIG. 1 or 10, respectively, is used in the eyepiece of the binoculars, monoculars, field glasses, telescopes, or focusing devices, the distance between the opening 9 of the Twist Up ring 2 and the eyepiece lens can be adjusted to 4 stages, and at each stage the distance can be maintained, even if a force is applied to the Twist Up ring 2 in the direction of the axis line.

The user of a binoculars, monoculars, field glasses, telescopes, or other focusing device in which the Twist Up device 1 is used in the eyepiece, moves the Twist Up ring 2 to adjust the distance between his eyeballs and the eyepiece lens, to the best-focused position of the 4 positions mentioned above. At this time, even if a force is applied to the Twist Up ring 2 in the direction of the axis line, it does not move as explained above. So the best-focused distance between his eyeballs and the eyepiece lens can be maintained, even if a force is applied to the Twist Up ring 2 in the direction of the axis line when he is looking through the binoculars, monoculars, field glasses, telescopes, or other focusing device. Therefore, it is very comfortable to use binoculars, monoculars, field glasses, telescopes, or other focusing devices in which the Twist Up device 1 is used in the eyepiece.

The Twist Up device taught in this invention is not restricted by the Twist Up device 1. As long as the above-mentioned functions are secured, it can adopt various forms. For example, the number of Twist Up adjustment grooves may be any number, one or more, as desired. The number of adjustment steps in the Twist Up adjustment pins 4 may be any number, one or more, as desired. Additionally, and the shape of the Twist Up adjustment groove can vary in shape, angle, length or conformation, as may be desired, or corresponding to the number of steps desired.

Because the Twist Up device in the present invention has Twist Up adjustment grooves in multiple steps, it is possible to make Twist Up adjustments in multiple steps. Since these Twist Up adjustment grooves are structured to stop the Twist Up adjustment pins, it is possible to securely maintain a focused position obtained by Twist Up operation.

The Twist Up device in the present invention does not require springs or other parts, and it can be manufactured with a simple change to the shape of the conventional Twist Up adjustment groove. So the manufacturing cost may be minimized. The Twist Up device of this invention can be appropriately reinforced, to improve durability, strength, and minimize wear to the Twist Up operation with the use variously selected material with the desired characteristics. Additionally, the present invention provides the user with a feel-response as it clicks into the desired position when the Twist Up adjustment pins move along to each pin stopping section.

What is claimed is:

1. A twist up device comprising:
   a support ring having an outer circumference and at least one twist up adjustment pin that protrudes outward from the outer circumference,
   at least one twist up adjustment ring having a wall and at least one adjustment groove disposed in said wall that receives said adjustment pin and allows the adjustment pin to move in said adjustment groove so that the adjustment ring may rotate around the outer circumference of the support ring, the adjustment groove having at least two pin movement sections that allow the adjustment pin to move in a desired axial direction, the adjustment groove further comprising at least one pin-stopping section installed between the two pin movement sections, the pin-stopping section being configured to engage the adjustment pin to prevent the adjustment pin from moving in the desired axial direction so that it is possible to securely maintain an adjustment pin position in the adjustment groove.

2. The twist up device according to claim 1, the support ring being disposed inside the inner circumference of the twist up adjustment ring and having at least one resisting part that gives a required resistance force against the movement of the twist up adjustment ring when the twist up device is operated.

3. A twist up device comprising:
   a support ring having an outer circumference and at least one twist up adjustment pin that protrudes outward from the outer circumference, and
   a twist up adjustment ring having a wall and at least one twist up adjustment groove disposed in said wall that receives the at least one twist up adjustment pin so as to allow the pin to move in the adjustment groove of the said twist up adjustment ring, the adjustment groove comprising:
   a pin-movement section, that allows the at least one twist up adjustment groove to receive the at least one twist up adjustment pin and to move the adjustment pin in said adjustment groove;
   a pin-stopping section installed next to the pin-movement section to engage the above mentioned at least one adjustment pin to prevent the at least one twist up adjustment pin from moving in the direction of the adjustment groove,
   wherein the twist up device allows a lens to be adjusted in stages, and at each stage a certain lens distance can be maintained even if a force is applied to the adjustment ring in a desired rotation direction and axial direction of the adjustment ring.

4. The twist up device according to claim 3, the groove of the twist up adjustment ring having a first groove opening and a second groove opening, the first and second groove openings being on opposing ends of the twist up adjustment ring, the pin-movement section being installed so that it extends diagonally from the first groove opening to the second groove opening of the twist up adjustment ring, and the pin-stopping section being installed in the direction from the end of the second groove opening of the pin-movement section to the circumference perpendicular to the axis line of the twist up adjustment ring, or to the direction of the first groove opening.

5. The twist up device according to claim 4, the at least one twist up adjustment groove comprising the following sections:
- a first pin-movement section,
- a first pin-stopping section that is set in the direction from the end of the second groove opening of the pin-movement section to the above mentioned first groove opening,
- a second pin-movement section that is set in the direction from the end of the first groove opening of the first pin-stopping section to the second groove opening, a second pin-stopping section that is set in the direction from the end of the second groove opening of the second pin-movement section to the first groove opening,
- a third pin-movement section that is set in the direction from the end of the first groove opening of the pin-stopping section to the direction of the second groove opening, and
- a third pin-stopping section that is set in the direction from the end of the second groove opening of the third pin-movement section to the circumference that is perpendicular to the axis line of the twist up adjustment ring.

6. The twist up device according to claim 5, the twist up adjustment ring having at least one angled contact section to receive the twist up adjustment pin at the end of at least one pin-movement section from the opening side in the direction of extension from the end to the pin-movement section.

7. The twist up device according to claim 6, the support ring being disposed inside the inner circumference of the twist up adjustment ring and having at least one resisting part that gives a required resistance force against the movement of the twist up adjustment ring when the twist up device is operated.

8. The twist up device according to claim 4, the twist up adjustment ring having at least one angled contact section to receive the twist up adjustment pin at the end of at least one pin-movement section from the opening side in the direction of extension from the end to the pin-movement section, wherein the pin movement section is partially angled in a first axial direction, and wherein the angled contact section angles at least partially in a second axial direction opposite the axial direction of the first axial direction.

9. The twist up device according to claim 8, the support ring being disposed inside the inner circumference of the twist up adjustment ring and having at least one resisting part that gives a required resistance force against the movement of the twist up adjustment ring when the twist up device is operated.

10. The twist up device according to claim 4, the support ring being disposed inside the inner circumference of the twist up adjustment ring and having at least one resisting part that gives a required resistance force against the movement of the twist up adjustment ring when the twist up device is operated.

11. The twist up device according to claim 5, the support ring being disposed inside the inner circumference of the twist up adjustment ring and having at least one resisting part that gives a required resistance force against the movement of the twist up adjustment ring when the twist up device is operated.

12. A twist up device, comprising:
- a support ring having an outer circumference and at least one twist up adjustment pin that protrudes outward from the outer circumference, and
- a twist up adjustment ring having a wall and at least one twist up adjustment groove disposed in said wall that receives the at least one twist up adjustment pin so as to allow the pin to move in the adjustment groove of the said twist up adjustment ring, the adjustment groove comprising:
- a pin-movement section, that allows the at least one twist up adjustment groove to receive the at least one twist up adjustment pin and to move the adjustment pin in said adjustment groove;
- a pin-stopping section installed next to the pin-movement section to engage the above mentioned at least one adjustment pin to prevent the said twist up adjustment pin from moving in the direction of the adjustment groove, the support ring being disposed inside the inner circumference of the twist up adjustment ring and having at least one resisting part that gives a required resistance force against the movement of the twist up adjustment ring when the twist up device is operated.

* * * * *